US005247883A

United States Patent [19]

Kuwahara et al.

[11] Patent Number: 5,247,883

[45] Date of Patent: Sep. 28, 1993

[54] APPARATUS FOR MAKING A PRINTING PLATE AND A PRINTING PLATE THEREOF

[75] Inventors: Sohichi Kuwahara; Shigeyoshi Hirashima; Tatsumi Ito, all of Kanagawa, Japan

[73] Assignee: Sony Corporation, Tokyo, Japan

[21] Appl. No.: 989,979

[22] Filed: Dec. 4, 1992

Related U.S. Application Data

[63] Continuation of Ser. No. 726,354, Jul. 5, 1991, abandoned.

[30] Foreign Application Priority Data

Jul. 9, 1990 [JP] Japan .................................. 2-180893
Jul. 9, 1990 [JP] Japan .................................. 2-180894

[51] Int. Cl.[5] ......................... B41C 1/05; B23K 26/06

[52] U.S. Cl. ................................. 101/170; 101/401.1; 101/395; 219/121.68; 219/121.75; 219/121.78; 346/108

[58] Field of Search ....................... 219/121.68, 121.69, 219/121.73, 121.74, 121.75, 121.78; 101/170, 401.1, 467, 395; 346/108

[56] References Cited

U.S. PATENT DOCUMENTS

| | | | |
|---|---|---|---|
| 2,662,455 | 6/1949 | Freund | 354/11 |
| 3,985,953 | 10/1976 | Dunkley | 346/76 L |
| 4,149,183 | 4/1979 | Pellar et al. | 358/75 |
| 4,388,865 | 6/1983 | Kellner | 101/401.1 |
| 4,395,946 | 8/1983 | Price | 101/170 X |
| 4,812,861 | 3/1989 | Sasaki et al. | 346/108 |
| 4,900,649 | 2/1990 | Mochizuki et al. | 346/76 L X |

FOREIGN PATENT DOCUMENTS

| | | | |
|---|---|---|---|
| 2030929 | 5/1990 | European Pat. Off. . | |
| 0044295 | 2/1989 | Japan | 219/121.73 |
| 370271 | 4/1980 | United Kingdom . | |
| 2223984 | 4/1990 | United Kingdom | 101/401.1 |

OTHER PUBLICATIONS

Patent Abstracts of Japan, Publication No. JP62238743 (Atsushi et al.).

*Primary Examiner*—Edgar S. Burr
*Assistant Examiner*—Stephen R. Funk
*Attorney, Agent, or Firm*—Lewis H. Eslinger; Jay H. Maioli

[57] ABSTRACT

An apparatus for making a printing plate in which a printing plate made of a thermoplastic resin sheet is wrapped around a plate cylinder and a laser beam from a laser source is irradiated on the printing plate to form holes in accordance with image information is comprised of an angle adjusting means for adjusting an irradiation angle of the laser beam from the laser source and control device for controlling the irradiation start position of the laser beam such that holes on the printing plate are made continuous at a predetermined angle. Thus, a printing plate having various dot patterns can be obtained only by adjusting the optical system of this apparatus and a printed product in which the occurrence of moiré can be avoided can be obtained.

4 Claims, 17 Drawing Sheets

APPARATUS FOR MAKING A PRINTING PLATE AND A PRINTING PLATE THEREOF

This is a continuation of application Ser. No. 07/726,354, filed Jul. 5, 1991 now abandoned.

BACKGROUND OF THE INVENTION

1. Field of the Invention

The present invention generally relates to apparatus for making a printing plate and a printing plate thereof and, more particularly, is directed to an apparatus for making a printing plate and a printing plate thereof suitable for printing, such as a gravure printing and so on.

2. Description of the Prior Art

A wide variety of printing methods are proposed for printing and a variety of printing plates, such as relief printing, offset printing, intaglio printing, silk screen printing or the like are employed. Particularly, when pictures such as photographs and so on are printed on a large number of copies at high speed, the intaglio printing is used.

The assignee of the present application has previously proposed an inexpensive apparatus for making a printing plate and a printing plate thereof. The previously-proposed apparatus and the printing plate thereof can provide a printing of high quality and are suitable for the printing of medium quantity of papers so that they can be made for personal use or for office use (see U.S. patent application Ser. No. 07/404,555 filed Sep. 8, 1989 now U.S. Pat. No. 5,126,531).

FIG. 1 shows a conceptual diagram of an optical system of such previously-proposed apparatus for making a printing plate. According to this conventional apparatus, a small energy emitting type semiconductor laser 1 of about 1 Watt is employed to form holes 3 on a printing plate 2.

As shown in FIG. 1, an input image signal 4 from an image scanner or the like is supplied to the semiconductor laser 1, in which it is directly modulated by turning on and off the semiconductor laser 1 by the image input signal which results from pulse code modulating (PCM) a drive current. For this reason, a laser beam emitted from the semiconductor laser 1 is turned on and off in synchronism with the image signal.

Referring to FIG. 1, the laser beam from the semiconductor laser 1 is collimated by a collimator lens 5 and introduced through an objective lens 6 into the printing plate 2 so that the laser beam is focused on the surface position of the printing plate 2. The semiconductor laser 1, the collimator lens 5 and the objective lens 6 constitute a laser block 14, and this laser block 14 is located so as to focus the laser beam on a plate cylinder 8 at its predetermined position on the leftmost side. The plate cylinder 8 is rotated in the direction shown by an arrow B in FIG. 1 by a plate cylinder rotating motor (not shown) coupled to a plate cylinder shaft 9 so that, when the plate cylinder 8 is rotated once, the holes 3 of one track along the circumference of the plate cylinder 8 are scattered by the laser beams to thereby form the holes 3 of predetermined one track amount. Then, if the laser block 14 is moved in the axial direction of the plate cylinder 8 by the amount of one pixel to allow the laser beam to scan the surface of the printing plate 2, the predetermined holes 3 are formed over two tracks. Therefore, if such scanning of laser beam is sequentially carried out on the whole surface of the plate cylinder 8, then holes 3 corresponding to the light and shade (i.e., image information) of the input image signal 4 are formed on a synthetic resin material coated on the surface of the printing plate 2.

When a printed product is produced by using the printing plate 2 and a screen while overlapping inks, such as a cyan (C), magenta (M), yellow (Y) black (B) or the like, a dark and light stripe pattern called moiré appears in various shapes. In order to prevent moiré from occurring, angles at which the printing plates 2 are attached to respective color printing plates are adjusted variously so as to make the moiré inconspicuous. For example, the angles of the printing plates 2 of deep colors such as cyan, magenta, black or the like are set to be 30 degrees in which the moiré becomes inconspicuous relatively such as when the angle of the black printing plate 2 is 45 degrees, the angle of the magenta printing plate 2 is 75 degrees, the angle of the yellow printing plate 2 is 90 degrees and the angle of the cyan printing plate 2 is 105 degrees. If the attaching angle is 15 degrees, the moiré tends to become conspicuous as compared with the attaching angle of 30 degrees. However, if the yellow printing plate of low color concentration is disposed between the cyan and magenta printing plates (in this case, the yellow printing plates are disposed at the angle of 15 degrees relative to the cyan and magenta printing plates), the moiré can be made inconspicuous.

The pattern of the hole 3 formed on the printing plate 2 by the conventional apparatus for making a printing plate is hyperelliptic as shown by reference numeral 10 in FIG. 2. By way of example, the major axis length of this hyperelliptic pattern 10 is 150 μm and the minor axis length thereof is about 5 μm. In the present invention, by making effective use of the fact that the pattern of hole 3 is hyperelliptic, it is possible to obtain the printing plate in which the shape, pitch or angle of the pattern 10 of the hole 3 formed on the printing plate 2 are variously changed only by adjusting the optical system of the apparatus for making a printing plate.

OBJECTS AND SUMMARY OF THE INVENTION

Accordingly, it is an object of the present invention to provide an improved apparatus for making a printing plate and a printing plate thereof in which the aforementioned shortcomings and disadvantages of the prior art can be substantially eliminated.

More specifically, it is an object of the present invention to provide an apparatus for making a printing plate and a printing plate thereof in which a printing plate having various dot patterns can be obtained by merely changing the optical system of the apparatus for making a printing plate.

It is another object of the present invention to provide an apparatus for making a printing plate and a printing plate thereof in which the occurrence of moiré in the printed product is suppressed with ease.

As a first aspect of the present invention, an apparatus for making a printing plate in which a printing plate made of a thermoplastic resin sheet is wrapped around a plate cylinder and a laser beam from a laser light source is irradiated on the printing plate to form holes in accordance with image information comprises angle adjusting means for adjusting an irradiation angle of the laser beam from the laser light source and control means for controlling the irradiation start position of the laser beam so that holes on the printing plate are made continuous at a predetermined angle.

According to the apparatus for making a printing plate and the printing plate thereof, the printing plate having different dot patterns can be obtained by scanning the elliptic pattern of the laser beam projected on the printing plate in the minor axis direction. Also, the printing plate having different dot patterns and different dot angles can be obtained with ease by rotating the optical axis of the laser light source in the clockwise or counter-clockwise direction by the single optical system. Further, if the printing is made by using a plurality of printing plates thus obtained, it is possible to effectively prevent the occurrence of moiré. Furthermore, if the dots are coupled on the line, then it is possible to suppress the cause of occurrence of the moiré.

The above and other objects, features, and advantages of the present invention will become apparent from the following detailed description of illustrative embodiments thereof to be read in conjunction with the accompanying drawings, in which like reference numerals are used to identify the same or similar parts in the several views.

Figure 13:
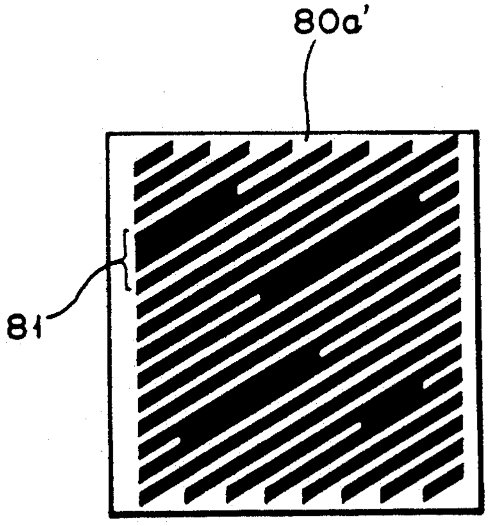
Figure 14B:
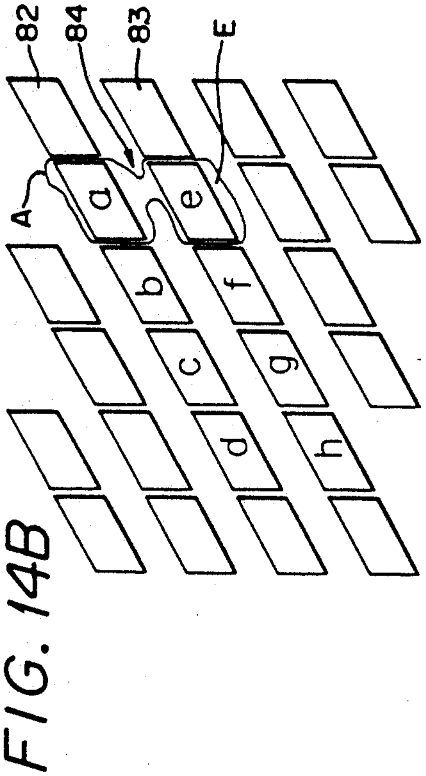
Figure 14A:
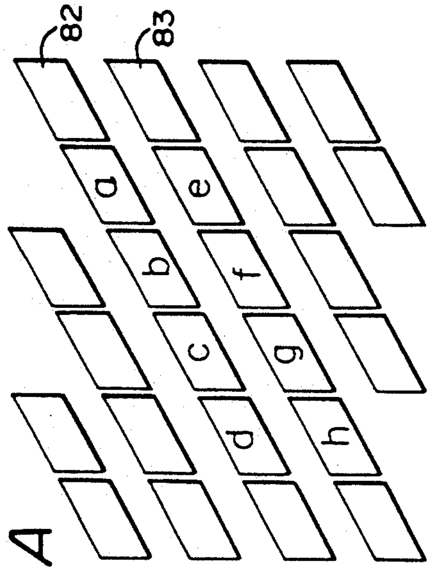
Figure 14C:
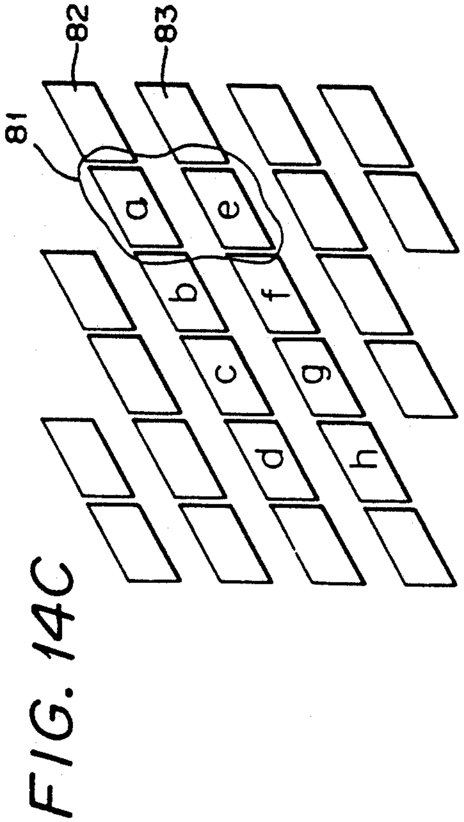
Figure 15:
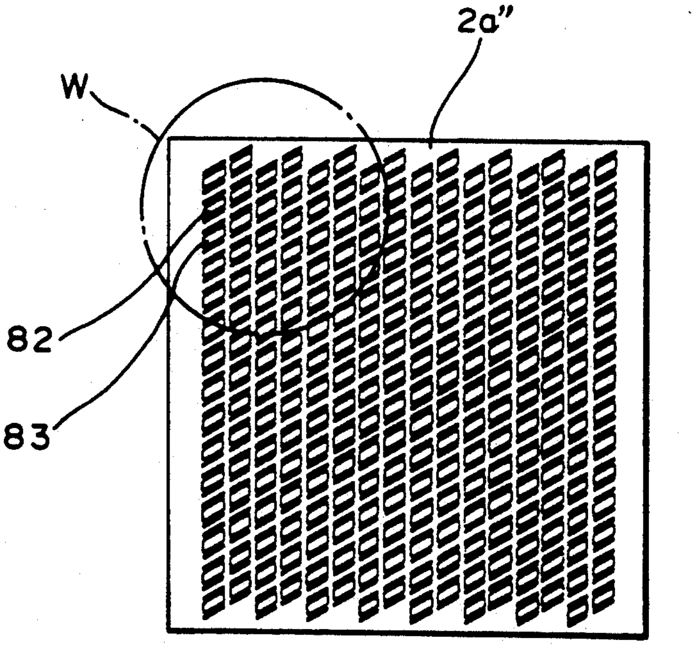
Figure 16:
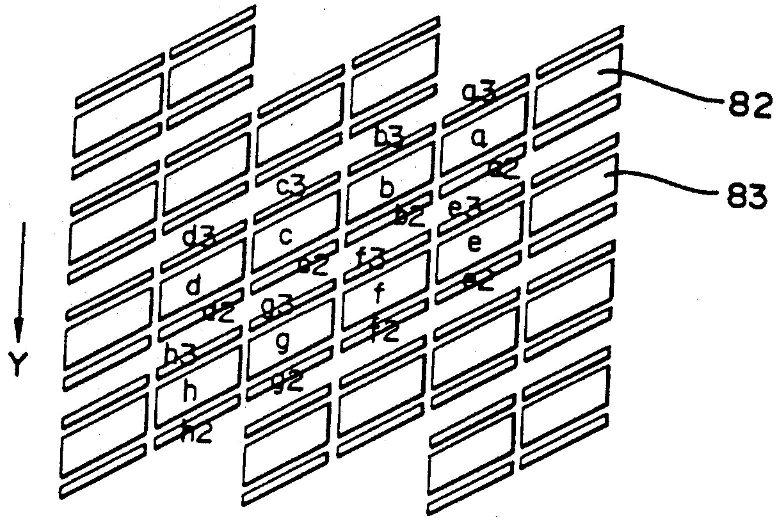
Figure 17:
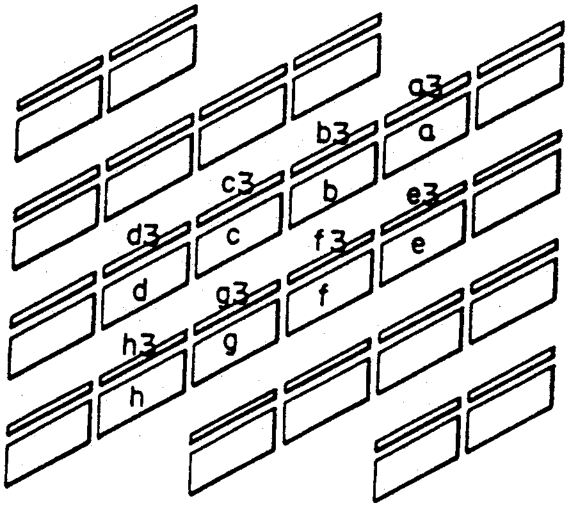

FIGS. llA through llG are schematic diagrams showing a variety of patterns formed on the printing plates of the present invention;

FIGS. 12A through 12G are schematic diagrams showing dot patterns of the printed products produced by the printing plates shown in FIGS. llA to llG, respectively;

FIG. 13 is a schematic diagram showing a dot pattern of a defective printed product obtained by the printing plate of the present invention;

FIGS. 14A through 14C are schematic diagrams showing dots in an enlarged scale, and to which references will be made in explaining the reason that irregularly coupled dots are produced, respectively;

FIG. 15 is a schematic diagram showing a pattern formed on the printing plate according to another embodiment of the present invention in an enlarged scale;

FIG. 16 is an enlarged schematic diagram of a portion represented by reference symbol W in FIG. 15; and FIG. 17 is a schematic diagram of a pattern formed on the printing plate according to a further embodiment of the present invention.

DETAILED DESCRIPTION OF THE PREFERRED EMBODIMENTS

Embodiments of the apparatus for making a printing plate and the printing plate thereof according to the present invention will hereinafter be described with reference to FIGS. 3 through 17.

Figure 1:
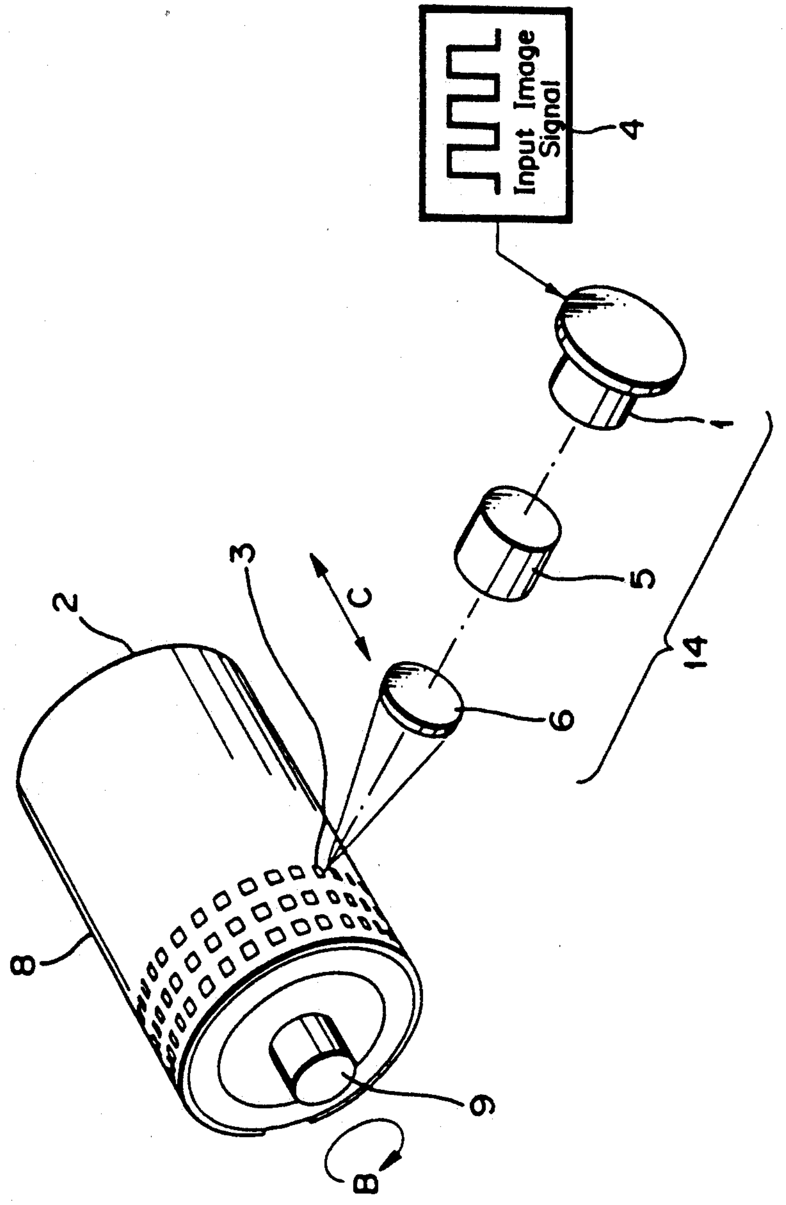
FIG. 1 (PRIOR ART)
FIG. 1 is a conceptual diagram of an optical system showing a laser scanning system according to the prior art.
Figure 2:
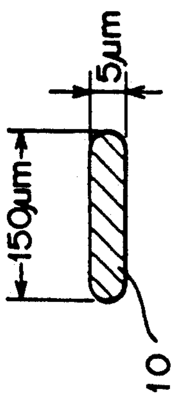
FIG. 2 (PRIOR ART)
FIG. 2 is a schematic diagram showing a projection pattern of a conventional semiconductor laser.
Figure 3A:
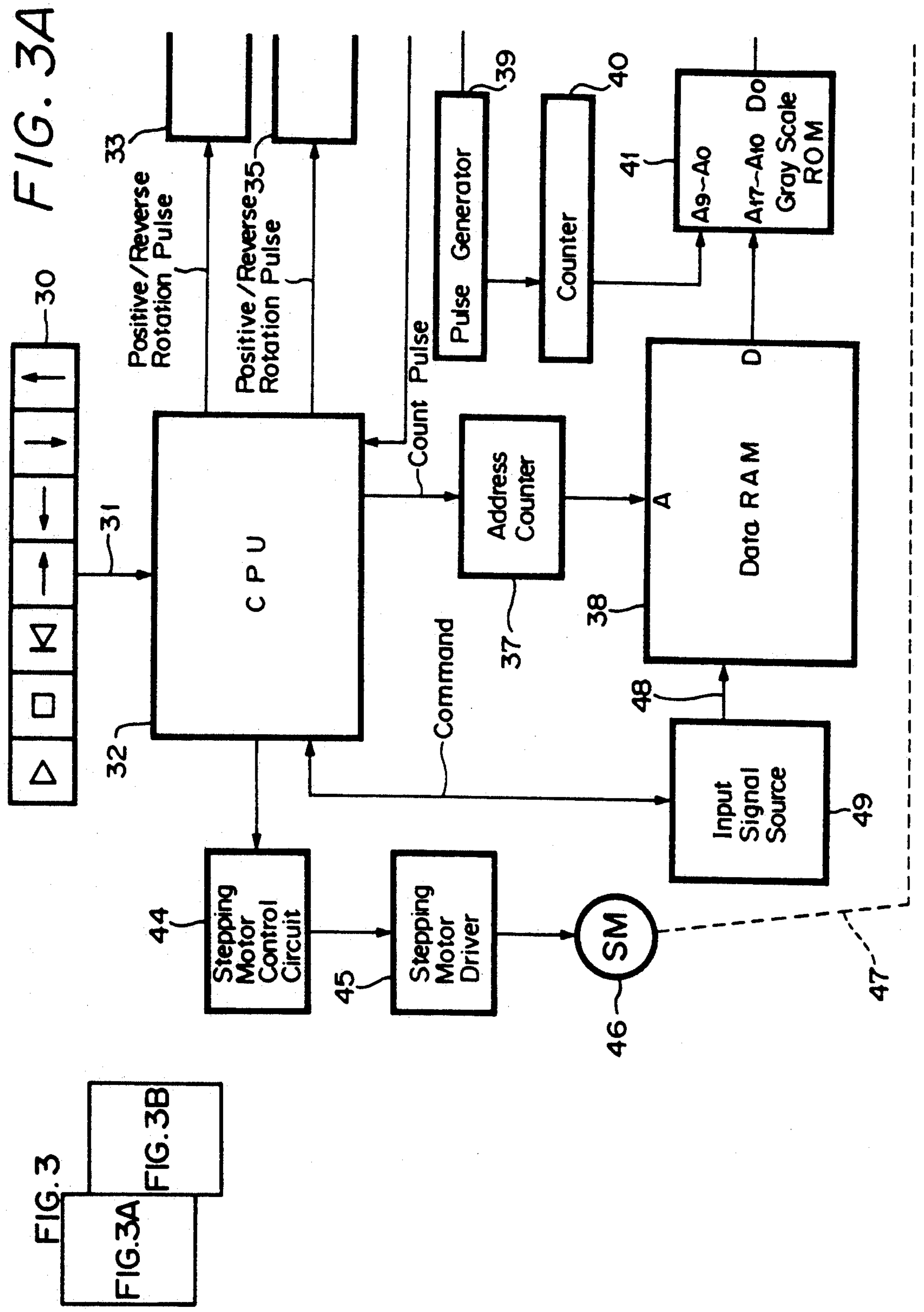
FIG. 3 (formed of FIGS. 3A and 3B) is a schematic block diagram showing an apparatus for making a printing plate and a printing plate thereof according to the present invention.
Figure 3B:
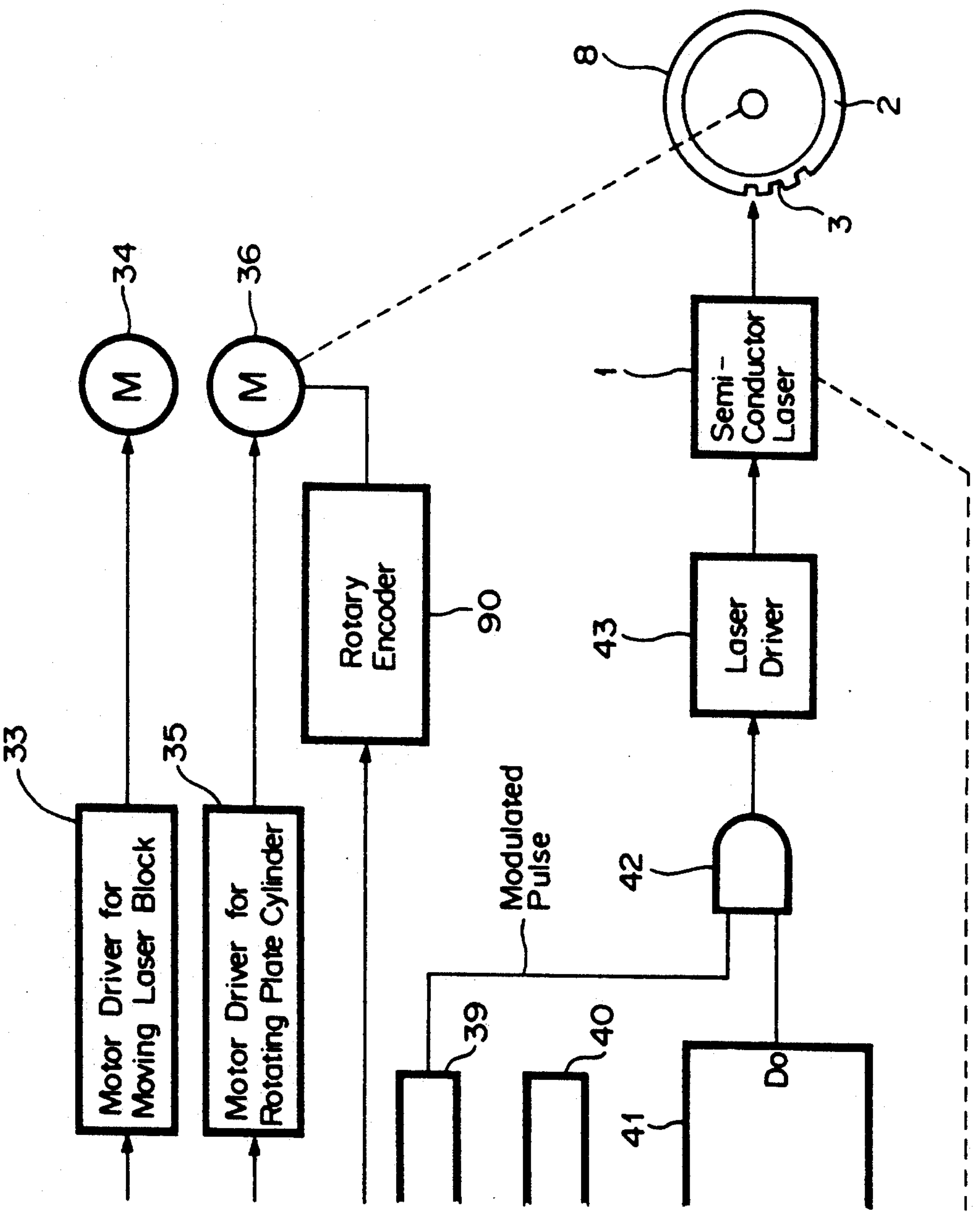

FIG. 3 is a schematic block diagram of the apparatus for making a printing plate according to an embodiment of the present invention and is formed of FIGS. 3A and 3B drawn on two sheets of drawings so as to permit the use of a suitably large scale. Data (image information) corresponding to the light and shade of the image signal is supplied to the semiconductor laser 1 through this system shown in FIGS. 3A, 3B. In FIGS. 3A, 3B, like parts corresponding to those of FIGS. 1 and 2 are marked with the same references and therefore need not be described in detail.

Referring to FIG. 3, a status signal 31 such as stop, reset or the like is supplied from an input operation unit 30 to a microcomputer (hereinafter referred to as a CPU (central processing unit)) 32. The CPU 32 supplies a positive rotation pulse or a reverse rotation pulse to a laser block moving motor driver 33 and a plate cylinder rotating motor driver 35 to drive the laser block moving motor 34 and the plate cylinder rotating motor 36. The plate cylinder driving motor 36 rotates the plate cylinder 8 and the semiconductor laser 1 forms the holes 3 corresponding to data 48 of the input image signal from an input signal source 49 on the printing plate 2. Each time the plate cylinder 8 is rotated, the laser block moving motor 34 is moved by the amount of one pixel data. The CPU 32 includes a control means which rotates the plate cylinder 8 in the up or down direction by the amount of half pixel to thereby control the irradiation position of the laser beam so that the holes 3 are made continuous at a predetermined angle.

While the laser radiation starting position between adjacent tracks is deviated by the amount of a half pixel by rotating the plate cylinder 8 as described above, a rotational angle of the plate cylinder 8 may be detected by using a rotary encoder 90 and a data reading start time from a data RAM (random access memory) 38 may be shifted by a predetermined rotational angle. In this fashion, the holes 3 corresponding to the light and shade of the image are sequentially formed along the circumference of the printing plate 2. The data RAM 38 stores 8 bits of digital image data D obtained by an image scanner or the like per pixel. The CPU 32 drives an address counter 37 so as to supply an output address A to the data RAM 38. In accordance with this address, the image data D is supplied to the addresses A17 to A10 of the gray scale ROM 41 and the gray scale ROM 41 is supplied at its addresses A9 to A0 with 10 bits from a counter 40 which is driven by a pulse from a pulse generator 39. The gray sale ROM 41 is adapted to convert the light and shade of the image into a duration of the laser irradiation time. Data of the gray scale ROM 41 is supplied to an AND gate 42 and the modulated pulse from the pulse generator 39 is controlled, whereby the semiconductor laser 1 is driven by means of a laser driver 43.

The CPU 32 controls a stepping motor 46 which can adjust the irradiation angle of semiconductor laser 1 provided within the laser block. More specifically, the CPU 32 supplies a stepping motor control circuit 44 with data corresponding to the instruction with respect to the radiation angle of the semiconductor laser 1 from the input operation unit 30. Then, the stepping motor control circuit 44 supplies this data to the stepping motor driver 45 to rotate the stepping motor 46 by a predetermined rotational angle.

Figure 4:
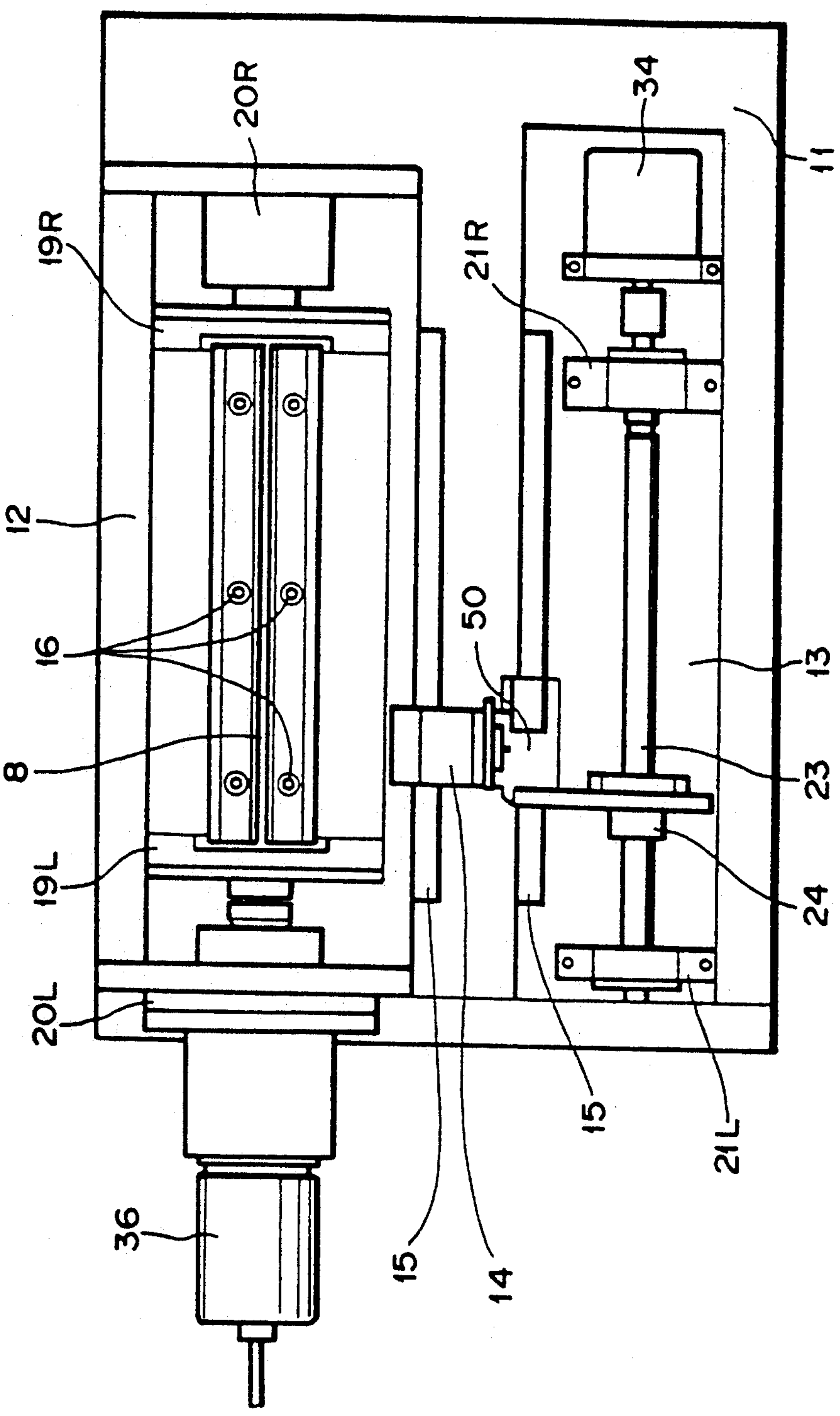
FIG. 4 is a plan view illustrating the apparatus for making a printing plate according to an embodiment of the present invention.

The overall arrangement of the apparatus shown in the block diagram of FIG. 3 will be described more fully with reference to FIG. 4 and the following drawings. FIG. 4 is a plan view illustrating the apparatus according to the embodiment of the present invention.

Figure 5:
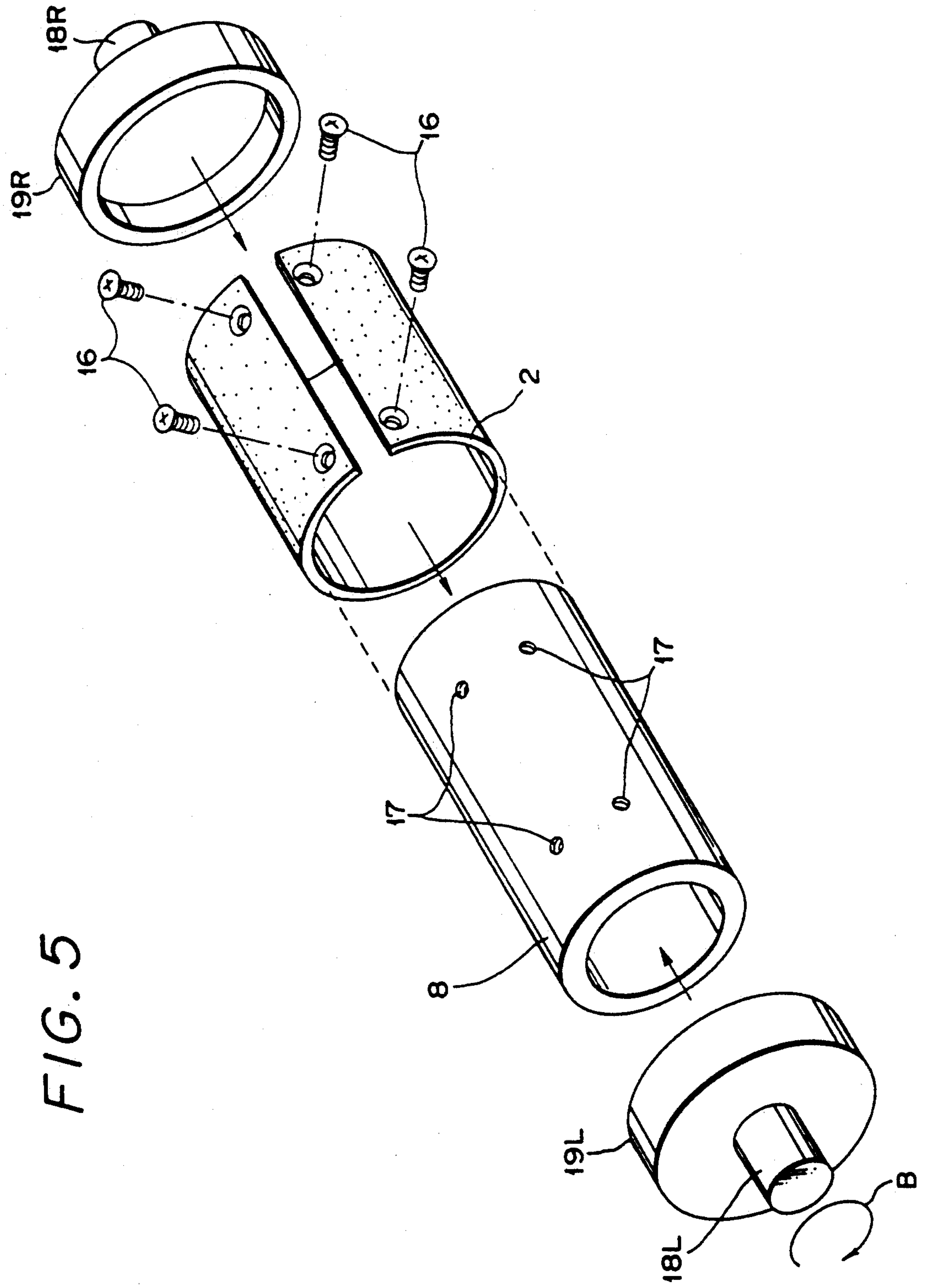
FIG. 5 is a perspective view of the printing plate of the present invention and to which references will be made in explaining the condition in which the printing plate is wrapped around a plate cylinder.

As shown in FIG. 4, a plate cylinder rotating unit 12 and a a laser block moving unit 13 are mounted on a base table 11. The laser block 14 is moved along a guide unit 15 in the axial direction of the plate cylinder 8. As shown in FIG. 5 which shows the mounted condition of the printing plate 2, the plate cylinder 8 of the plate cylinder rotating unit 12 is cylindrical and made of metal. The printing plate 2 made of synthetic resin is wrapped along the outer diameter of the cylindrical portion of the plate cylinder rotating unit 12 and secured thereto by fitting flat head screws 16 into screw apertures 17 bored through the plate cylinder 8. The method for securing the printing plate 2 around the cylindrical portion of the plate cylinder rotating unit 12 is not limited to the above method and a variety of methods may be selected properly. For example, the printing plate 2 is secured around the cylindrical portion by a double-sided adhesive tape or the like.

The printing plate 2 may be made of a thermoplastic resin whose boiling point is distributed in a relatively narrow range and which is sufficiently hard when cured and in which resin is scattered or sublimated at low temperature when melted. By way of example, as the material of the printing plate 2, it is possible to use such a thermoplastic resin in which about 20% of carbon is mixed into polyethylene resin, acrylic resin, polypropylene resin or the like. Further, a thickness t of the printing plate 2 is selected to be about 200 microns. Metal caps 19R, 19L are inserted into the right and left ends of the plate cylinder 8 so as to secure the right and left ends of the printing plate 2. Shafts 18R, 18L are implanted on the caps 19R, 19L and coupled to the plate cylinder rotating motor 36, whereby the plate cylinder 8 is rotated in the direction shown by an arrow B in FIG. 5. In FIG. 4, reference numerals 20R, 20L designate bearing portions which receive the shafts 18R, 18L of the metal caps 19R, 19L, respectively.

The laser block 14 is disposed in an opposing relation to the printing plate 2 wrapped around the plate cylinder 8 and is arranged so as to move along a guide portion 15 in the axial direction of the plate cylinder 8. The laser block moving unit 13 for moving this laser block 14 is bridged between the bearing portions 21R and 21L and includes a moving member 24 which is engaged with a wormscrew 23 rotated by the laser block moving motor 34 so as to move. A laser rod attaching base 50 of the laser block 14 is secured to the moving member 24.

Figure 6:
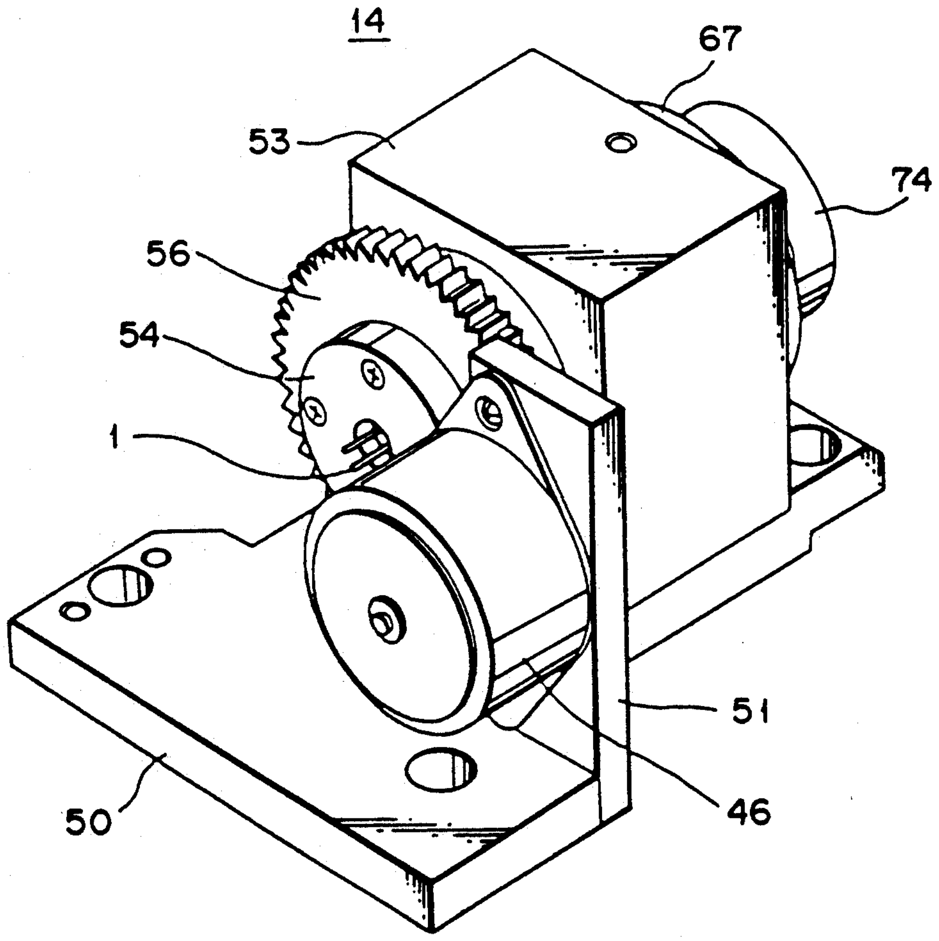
FIG. 6 is a perspective view illustrating the assembled state of a laser block used in the apparatus of the present invention.

The assembled condition of the laser block 14 will be described with reference to FIGS. 6 to 8. FIG. 6 is a perspective view illustrating the entirety,, of the laser block 14 in its assembled state, FIG. 7 is a partial cross-sectional plan view of the assembled state of the laser block 14 and FIG. 8 is an exploded perspective view of the laser block 14.

Figure 7:
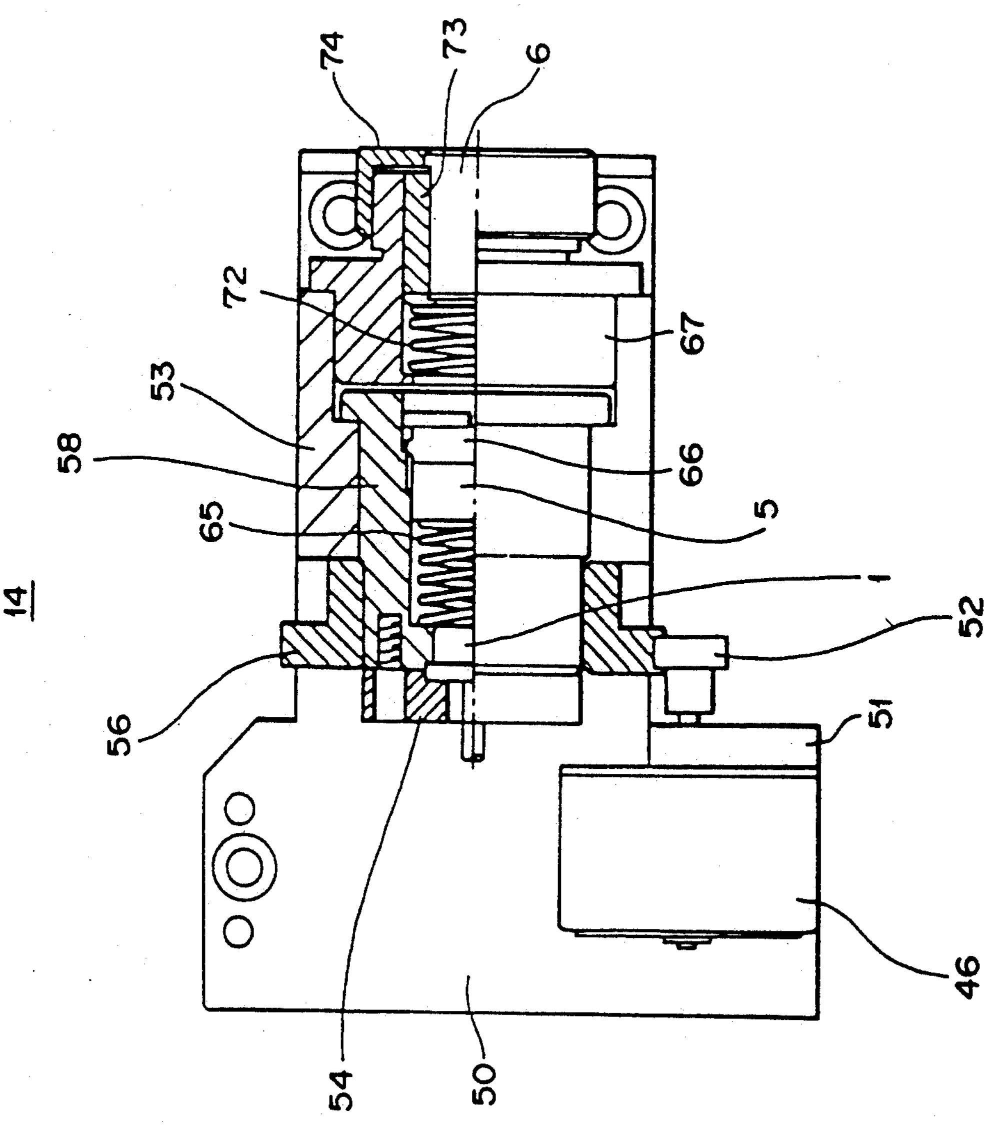
FIG. 7 is a plan view of the laser block used in the apparatus of the present invention and illustrating its assembled state in a partly cross-sectional fashion.
Figure 8:
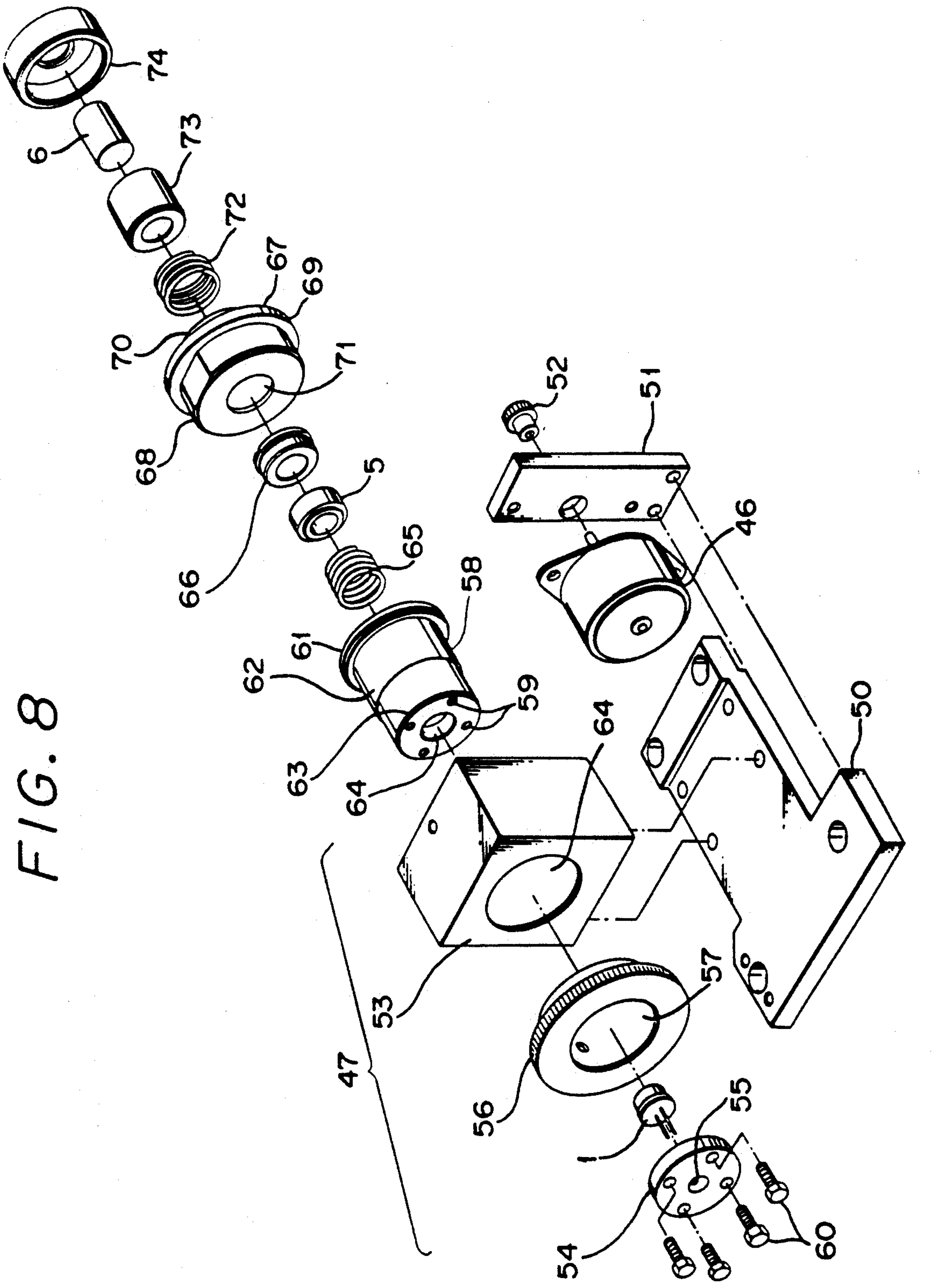
FIG. 8 is an exploded perspective view of the laser block used in the apparatus of the present invention.

As shown in FIGS. 6 to 8, a stepping motor attaching plate 51 is secured to a laser head mounting base 50 formed of a plate of substantially T-letter configuration by screws and the stepping motor 46 is secured to this mounting plate 51 as shown in FIG. 8. A first gear 52 is engaged into and secured to the rotary shaft of the stepping motor 46. A laser holder supporting box 53 is secured to the laser head mounting base 50 and the optical system of the semiconductor laser 1 or the like is assembled within this supporting box 53. The semiconductor laser 1 is secured to a semiconductor laser support 54 and is supplied with an electrical signal from a through-hole 55 bored through the central portion of the semiconductor laser support 54 through a stem pin. This semiconductor laser support 54 is screwed by screws 60 into tapped holes 59 bored through the rear surface of a laser holder 58 engaged into a through-hole 57 bored through the center of a second gear 56. A first stepped portion 62 elongated from a flange portion 61 of the laser holder 58 is loosely fitted into a through-hole 64 bored through the center of the laser holder supporting box 53 so as to be freely rotatable, while the through-hole 57 of the second gear 56 is inserted into and secured to the second stepped portion 63 of the laser holder 58. The top of the semiconductor laser 1 is protrusively inserted into one side end of a central aperture 64 bored through the center of the laser holder 58 and the collimator lens 5 is inserted into this central aperture 64 by means of a collimator lens adjusting coil spring 65. Then, a collimator lens adjusting screw 66 is inserted into and screwed into the central aperture 64 and the collimator lens 5 is housed in and secured to the laser holder 58. An outer portion of an objective lens holder 67 is composed of a stepped portion 68 whose outer diameter is the same as that of the flange portion 61 of the laser holder 58, a flange portion 69 and a screw portion 70 having screws formed therearound, and a central aperture 71 is formed at the central portion of the objective lens holder 67. The stepped portion 68 of the objective lens holder 67 is engaged into the through-hole 64 of the laser holder supporting box 53, an objective lens cover 73 into which the objective lens 6 is inserted is inserted through a focus adjusting spring 72 into a central aperture 71 and a focus adjusting screw 74 is screwed into the screw portion 70, thereby the laser block 14 being constructed. Further, an angle adjusting means 47 for adjusting the radiation angle of the laser is composed of the stepping motor 46, the first and second gears 52, 56 and the laser holder 58.

Figures 9A, 9B:
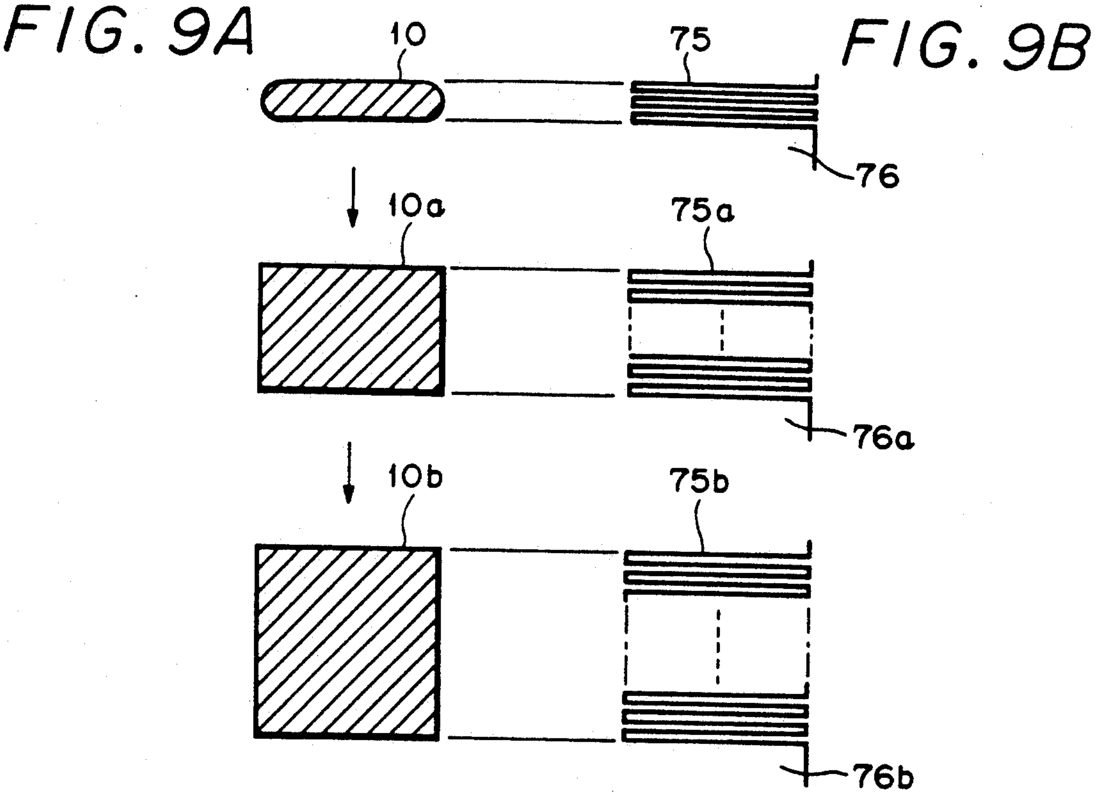
FIGS. 9A, 9B and 10A, 10B are schematic diagrams showing patterns formed by the apparatus of the present invention and waveform diagrams showing waveforms of signals used when these patterns are formed, respectively.

When the holes 3 are formed along the circumference of the printing plate 2 by the above-mentioned arrangement, the input image signal from the input signal source 49 such as the image scanner or the like is supplied and pulse code modulated so as to be turned on and off. While the hyperelliptic pattern 10 shown in FIG. 9A is formed on the printing plate 2 by an "on" pulse and an "off" pulse shown in FIG. 9B in the prior art, according to this embodiment, a rectangular pattern 10*a* or a square pattern 10*b* shown in FIG. 9A is obtained. To this end, in a relation between an "on" pulse 75*a* or 75*b* and an "off" pulse 76*a* or 76*b* as shown in FIG. 9B, if the modulated pulse from the pulse generator 39 is changed and if the values of the data RAM 38 and the gray scale ROM 41 or the like are changed so as to extend the on period, then it is possible to obtain the rectangular or square pattern 10*a* or 10*b* having a proper aspect ratio.

Figures 10A, 10B:
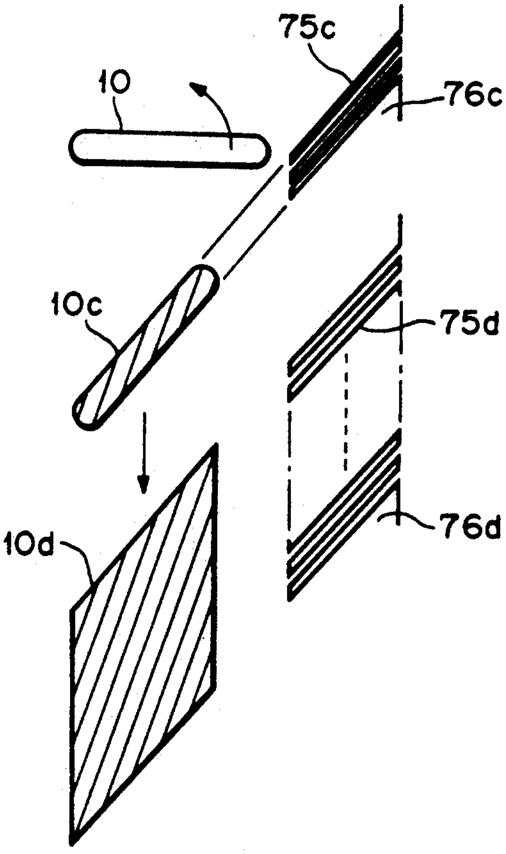

Further, in this embodiment, by the above angle adjusting means 47 disposed within the laser block 14, the irradiation angle of the semiconductor laser 1 is rotated by a predetermined angle from the hyperelliptic pattern 10 of the horizontal direction as shown in FIG. 10A to the clockwise or counter-clockwise direction before forming the holes 3 on the printing plate 2 so that the irradiation angle is inclined as shown by a pattern 10*c* shown in FIG. 10A. When the irradiation angle of the semiconductor laser 1 is inclined by a predetermined angle, such predetermined angle is communicated to the CPU 32 by the input operation unit 30 and then the CPU 32 instructs the pulse number for inclining the irradiation angle by a predetermined angle to the stepping motor control circuit 44, whereby the stepping motor 46 is stepped by a predetermined angle. Thus, the laser holder 58 is rotated by a predetermined angle in the clockwise or counter-clockwise direction via the first and second gears 52 and 56 so that the irradiation angle of the semiconductor laser 1 is changed to produce the pattern 10*c* of FIG. 10A. Under this condition, although the "on" pulse and "off" pulse are set in a relation shown in FIG. 10B, if the duration of the "on" pulse 75*d* is extended as shown in FIG. 10B in the relation between the "on" pulse 75*d* and the "off" pulse 76*d*, then it is possible to obtain a pattern 10*d* of lozenge shape as shown in FIG. 10A. As described above, by properly selecting the inclination angle and the duration of the "on" pulse period, then the lozenge pattern of arbitrary configuration whose inclination angle can be changed relative to the scanning direction can be obtained intermittently. As a result, it is possible to form hole patterns whose widths are in a range of from about 150 μm to about 5 μm. Also, the shape of the pattern can be changed variously from rectangular, square and lozenge so that dot angle, dot shape and dot pitch can be changed with ease. Therefore, it is possible to obtain the apparatus for making a printing plate and a printing plate thereof in which moiré of the printed product can be avoided with ease.

FIGS. 11A through 11F are representations of patterns of various configurations formed on the printing plate 2. In these patterns shown in FIGS. 11A to 11F, the concentration of the pattern is made uniform in order to understand the configurations of the patterns more clearly.

Figure 11C:
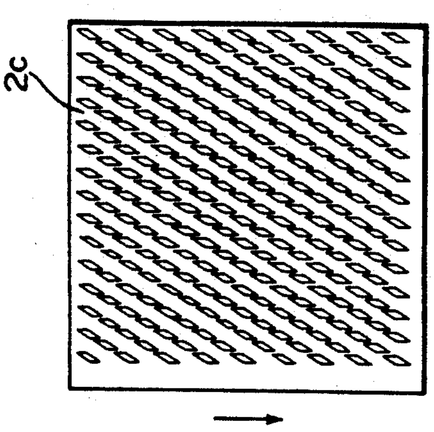
Figure 11B:
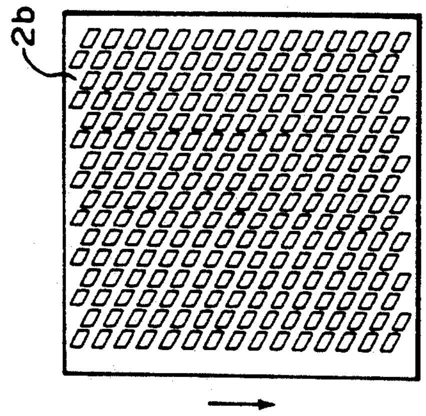
Figure 11A:
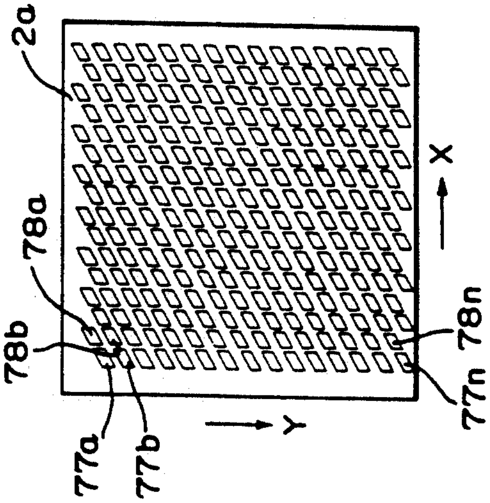

In the printing plate 2*a* shown in FIG. 11A, the hyperelliptic pattern 10 in the horizontal direction is rotated in the counter-clockwise direction and the rotational angle is 30 degrees. In the printing plate 2*b* shown in FIG. 11B, such hyperelliptic pattern 10 is rotated in the clockwise direction and the rotational angle is 30 degrees, that is, −30 degrees. In the printing plates 2*c* and 2*d* shown in FIGS. 11C, 11D, the hyperelliptic patterns 10 in the horizontal direction are respectively rotated in the counter-clockwise and clockwise directions by 60 degrees. When the above printing plates 2*a* through 2*d* are produced, as earlier noted, patterns 77*a*, 77*b*, . . . , 77*n* are formed in the direction shown by an arrow Y in FIG. 11A, that is, in the circumferential direction of the plate cylinder 8 by the semiconductor laser 1. Next, at the starting position of a pattern 78*a* at the starting point after the semiconductor laser 1 is moved in the X axis direction or in the axial direction of the plate cylinder 8 by one pixel amount, the laser irradiation is started at the position a half pixel above the position of the pattern 77*a*. Such control can be performed by the CPU 32 with ease. As described above, the starting points 77*a*, 78*b*, . . . are positioned in the X axis direction in a zigzag-fashion and therefore a pattern is presented in which the holes are formed continuously substantially in the irradiation direction of laser beam as generally seen from the printing plate. Further, the pitches in the X direction and Y direction between the pixels are properly set.

Figure 11F:
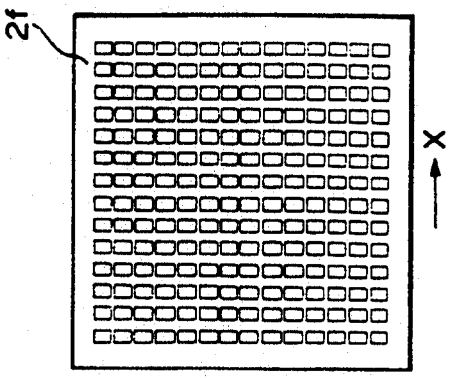
Figure 11E:
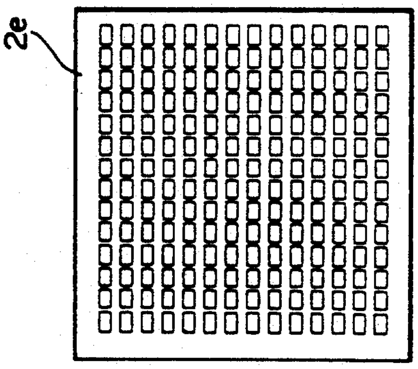
Figure 11D:
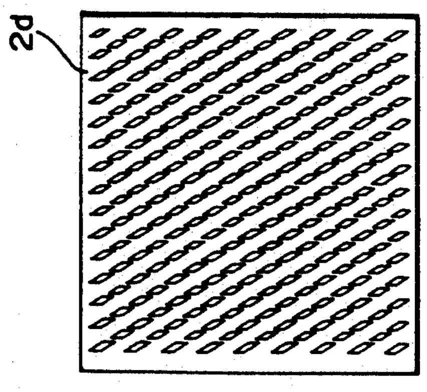

FIG. 11E shows the pattern of the printing plate 2*e* which is obtained by the method described with reference to FIG. 7 without changing the angle. FIG. 11F shows the pattern in which the major axis of the hyperelliptic pattern obtained by the semiconductor laser 1 is made coincident with the vertical direction by adjusting the angle and the laser beam is scanned in the X axis direction. In the printing plate 2*g* of FIG. 11G, the pattern is formed by moving the semiconductor laser pattern 10 shown in FIG. 9A along the circumferential direction (Y axis direction) of the plate cylinder 8 similarly to FIG. 11E and in this case, a gap 79 between adjacent tracks provided when the pattern of one track is formed is increased.

FIGS. 12A through 12F show dot patterns 80*a* to 80*g* of printing products obtained by the sheets 2*a*, 2*b*, 2*c*, 2*d*, 2*e*, 2*f* shown in FIGS. 11A through 11G. Unlike the dot pattern 80*g* shown in FIG. 12G, the dot patterns 12A through 12F are composed of the dot patterns 80*a*, 80*b*, 80*c*, 80*d* having an inclined stripe pattern in which dots are made continuous on the line and the dot patterns 80*e*, 80*f* having horizontal and vertical stripes so that the cause of moiré can be reduced by a half as compared with other dot patterns.

Figure 11G:
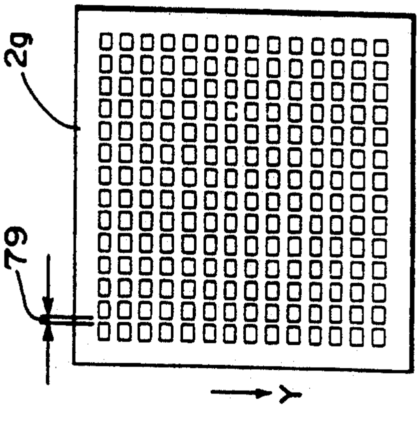

Of the plurality of printing plates thus made, cyan C is printed by the printing plate 2*a* shown, for example, in FIG. 11A, magenta M is printed by the printing plate 2*b* shown in FIG. 11B and yellow Y and blue B are printed by the printing plate 2*g* shown in FIG. 11G with the result that printed products in which moiré is inconspicuous are obtained.

Figure 12A:
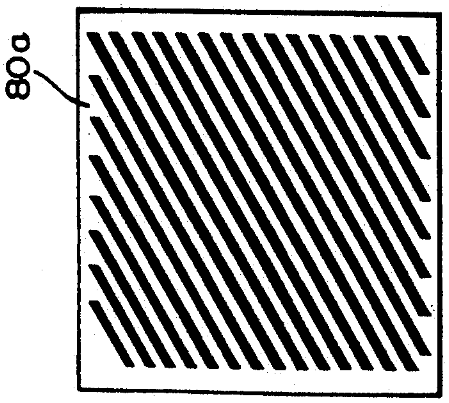
Figure 12B:
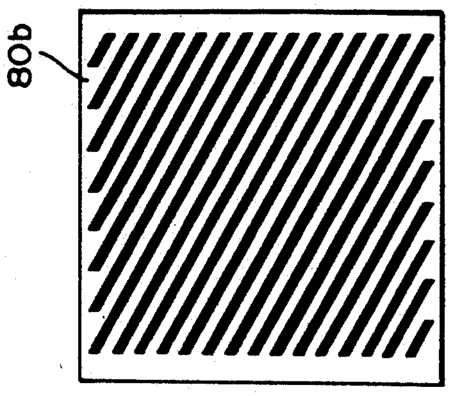
Figure 12C:
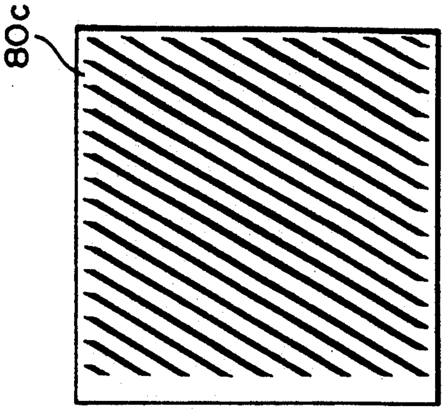
Figure 12F:
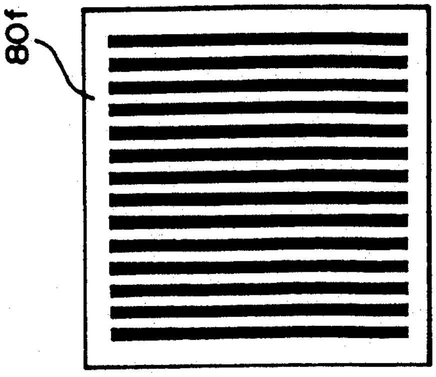
Figure 12E:
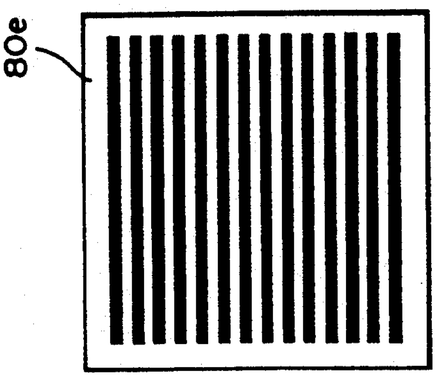
Figure 12D:
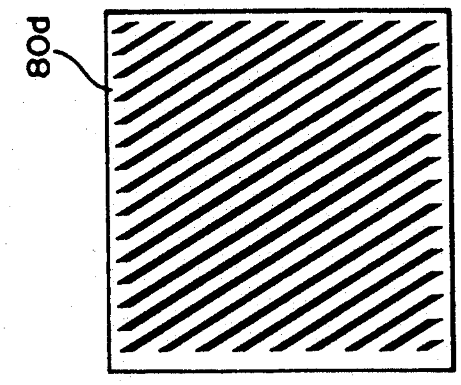
Figure 12G:
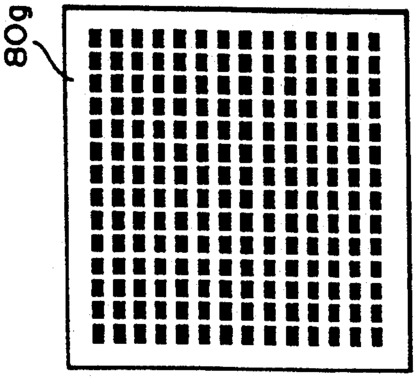

If the printed product 80*a* having the continuous stripe line shown in FIG. 12A is obtained by using the printing plate 2*a* shown, for example, in FIG. 11A, then a printed product 80*a*' in which irregular dots 81 are formed continuously as shown in FIG. 13 is obtained. Such printed product hinders the smooth change of gradation and causes the gradation to be changed partly, which results in an awkward pattern. The reason that the above-mentioned irregular dots 81 are produced will be described with reference to FIGS. 14A to 14C. FIG. 14A shows the intaglio printing dot pattern of the printing plate 2*a* in an enlarged scale. Assuming now that a, b, c, d and e, f, g, h are printing plate dot patterns between adjacent slant lines 82, 83, then printing plate dots a, b, c, d and e, f, g, h are coupled to one another to obtain printed products of slant stripe lines 82, 83. In this case, if inks A and E make slight contact with the intaglio dot pattern a on the line 82 and the intaglio dot pattern e on the line 83 by means of a doctor blade or the like as shown in FIG. 14B, then a surface tension occurs between the inks A and E to cause overflow of the inks that should remain in the intaglio dot patterns a and e. As a consequence, as shown in FIG. 14C, the amount of ink that escapes to the outside from the intaglio dot patterns a and e is increased and the lines 82 and 83 are covered with the ink so that the irregular dot patterns 81 are produced as shown in FIG. 13.

With reference to FIGS. 15 and 16, let us describe an intaglio dot pattern of a printing plate 2$a''$ in which the occurrence of the above irregularly-coupled dot pattern 81 is suppressed. FIG. 16 shows a part of the intaglio dot pattern represented by reference letter W in FIG. 15 in an enlarged scale. As shown in FIG. 16, such a pattern is formed that intaglio slots $a_3$, $b_3$, $c_3$, $d_3$, $a_2$, $b_2$, $c_2$, $d_2$, $e_3$, $f_3$, $g_3$, $h_3$ and $e_2$, $f_2$, $g_2$, $h_2$ are formed closely above and below the intaglio dot patterns a, b, c, d and e, f, g, h on the lines 82 and 83 so as to have widths narrower than those of the above intaglio dot patterns a, b, c, d and e, f, g, h. Such pattern as shown in FIG. 16 can be arranged with ease by the earlier-noted arrangement of FIG. 3. More specifically, the irradiation angle of the laser beam from the semiconductor laser 1 is adjusted so as to become 30 degrees in the counter-clockwise direction and then narrow, wide and narrow "on" pulses are supplied to the semiconductor laser 1. According to the thus made printing plate, even if the ink flows from the intaglio dot patterns a and e by a relatively large amount, then the ink from the intaglio dot pattern a is influenced by the intaglio slots $a_3$, $a_2$ and the ink from the intaglio dot pattern e is influenced by the intaglio slots $e_3$, $e_3$, thereby producing the pattern in which the intaglio patterns a and e can be separated from each other.

If the ink escaped from the intaglios dot pattern a reaches the intaglio slots $a_2$ and $e_3$ in FIG. 16, then the amount of the ink escaped from the intaglio slot $e_3$ is small as compared with the amount of the ink escaped from the intaglio dot pattern e. Then, this influence can be substantially prevented from being exerted upon the intaglio slots $f_3$ and $b_2$.

FIG. 17 shows a further example of the printing plate of the present invention. As shown in FIG. 17, the lower side intaglio slots $a_2$, $b_2$, $c_2$, $d_2$ and $e_2$, $f_2$, $g_2$, $h_2$ shown in FIG. 16 are removed and the intaglio slots are provided only in the upper side as shown by $a_3$, $b_3$, $c_3$, $d_3$ and $e_3$, $f_3$, $g_3$, $h_3$.

According to the thus made printing plates, the irregular continuous dots on the printed product can be reduced so that the printed product in which the gradation is partly changed abruptly cannot be made with ease. Furthermore, it is possible to obtain the apparatus for making a printing plate and the printing plate thereof in which the moiré can be reduced.

According to the apparatus for making a printing plate and the printing plate thereof of the present invention, it is possible to obtain a printing plate having a variety of dot patterns only by changing the optical system of the apparatus for making a printing plate. Also, by making the gravure printing by using the printing plates in which the dot angles and the dot patterns of these printing plates are changed, it is possible to obtain a printed product in which the occurrence of moiré can be suppressed.

Having described the preferred embodiments of the invention with reference to the accompanying drawings, it is to be understood that the invention is not limited to those precise embodiments and that various changes and modifications thereof could be effected by one skilled in the art without departing from the spirit or scope of the invention as defined in the appended claims.

What is claimed is:

1. An apparatus for making a printing plate, the apparatus comprising:

a cylinder;

a thermoplastic resin sheet wrapped around said cylinder;

first drive means coupled to said cylinder for rotating said cylinder at a predetermined rate;

a semiconductor laser for emitting a laser beam. in which a cross-section of said laser beam has a major axis and a minor axis;

laser beam projection means for projecting said laser beam from said semiconductor laser onto said resin sheet to make holes on the resin sheet in accordance with image information;

second drive means coupled to said laser beam projection means for moving said laser beam projection means in an axial direction of said cylinder at a predetermined rate;

angle adjusting means mechanically connected to said semiconductor laser for rotating said semiconductor laser and changing an angle of said major axis of said laser beam, so that said angle is not parallel with said axial direction of said cylinder; and control means for controlling projection starting points of said laser beam on said resin sheet, so that said holes are substantially continuous in parallel with said angle of said major axis of said laser beam.

2. An apparatus for making a printing plate according to claim 1 wherein said laser beam is projected so as to form slots near said holes, said slots being narrower than said holes.

3. An apparatus for making a printing plate according to claim 1, wherein said angle adjusting means includes a stepping motor for incrementally rotating said semiconductor laser.

4. An apparatus for making a printing plate according to claim 3, wherein said angle adjusting means further includes a first gear mounted on a shaft of said stepping motor, a laser holder supporting box, a laser holder being mounted for rotation on said laser holder supporting box and having said semi-conductor laser affixed thereto, a second gear attached to said laser holder and being engaged with said first gear, whereby upon incremental rotation of said stepping motor said semi-conductor laser is rotated.

* * * * *